United States Patent
Schober

(10) Patent No.: US 8,109,312 B2
(45) Date of Patent: Feb. 7, 2012

(54) TIRE PATCH APPLICATOR

(75) Inventor: Bradley D. Schober, Greer, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 249 days.

(21) Appl. No.: 11/967,158

(22) Filed: Dec. 29, 2007

(65) Prior Publication Data

US 2009/0165928 A1    Jul. 2, 2009

(51) Int. Cl.
  B29C 73/12    (2006.01)
  B29C 73/10    (2006.01)
  B29D 30/06    (2006.01)

(52) U.S. Cl. ......... 156/421.6; 156/95; 156/97; 156/115; 156/293; 81/15.2; 81/15.7; 152/367

(58) Field of Classification Search ............ 156/95, 156/97, 421.6, 292, 115, 295, 356, 386, 500, 156/578, 123, 196, 212, 230, 237, 293, 475, 156/574, 580, 581; 81/15.5, 15.2, 15.7; 138/98; 152/371, 367; 428/63; 269/278; 100/228, 100/269.2

See application file for complete search history.

(56) References Cited

U.S. PATENT DOCUMENTS

| | | | |
|---|---|---|---|
| 1,718,485 A | 6/1929 | O'Sullivan | |
| 2,163,876 A | 6/1939 | Hill | |
| 2,236,913 A * | 4/1941 | Patterson | 138/99 |
| 2,292,485 A | 8/1942 | Slatkin | |
| 2,426,767 A | 9/1947 | Dupont | |
| 2,432,139 A | 12/1947 | Crowley | |
| 2,443,987 A * | 6/1948 | Morrison et al. | 269/21 |
| 2,447,740 A | 8/1948 | Crowley | |
| 2,530,411 A | 11/1950 | Van Scoyk | |
| 2,536,717 A | 1/1951 | Boyer | |
| 2,538,149 A | 1/1951 | Fannen | |
| 2,825,930 A | 3/1958 | Gaillard | |
| 3,190,338 A | 6/1965 | Wolfe | |
| 3,221,648 A * | 12/1965 | Weiss | 101/129 |
| 3,407,985 A * | 10/1968 | Miller | 228/51 |
| 3,919,021 A | 11/1975 | Whittle | |
| 4,083,205 A * | 4/1978 | Clarke et al. | 68/5 C |
| 4,303,380 A | 12/1981 | Frankforter | |
| 4,347,096 A | 8/1982 | Schorscher | |
| 4,583,928 A | 4/1986 | Fink | |
| 4,590,854 A * | 5/1986 | Anderson | 101/35 |
| 4,696,228 A * | 9/1987 | David et al. | 101/123 |
| 4,699,584 A * | 10/1987 | Kurita et al. | 425/450.1 |
| 5,250,141 A | 10/1993 | Scheurer | |
| 5,399,223 A * | 3/1995 | Vogt | 156/285 |
| 5,423,932 A * | 6/1995 | Schinabeck | 156/94 |
| 5,447,596 A * | 9/1995 | Hayase | 156/584 |
| 5,450,796 A * | 9/1995 | Sakagami | 104/89 |

(Continued)

Primary Examiner — Richard Crispino
Assistant Examiner — Martin Rogers
(74) Attorney, Agent, or Firm — Hahn Loeser & Parks LLP; Bret A. Hrivnak

(57) ABSTRACT

Methods and apparatus for applying a patch to an interior surface of a tire, the apparatus comprising a patch holder having the top surface shaped to a contour of the interior surface of the tire, the patch holder comprising a patch receptacle and a plurality of orifices extending there through in fluid communication with a vacuum source, and, an adhesive barrier surrounding the patch receptacle. The steps of a method include placing a patch into a patch receptacle in a tire patch holder, the patch holder having the top surface shaped to a contour of the interior tire surface, directing the patch holder to obliquely contact the interior surface of the tire, and, pressing the patch into substantial adhesive contact with the interior tire surface.

11 Claims, 8 Drawing Sheets

U.S. PATENT DOCUMENTS

| | | | |
|---|---|---|---|
| 5,478,782 A * | 12/1995 | Satoh et al. | 438/455 |
| 5,769,999 A * | 6/1998 | Anderson et al. | 156/359 |
| 5,865,918 A * | 2/1999 | Franklin et al. | 156/64 |
| 6,041,702 A * | 3/2000 | Ichikawa et al. | 101/35 |
| 6,115,898 A * | 9/2000 | Sawdon | 29/243.5 |
| 6,267,287 B1 * | 7/2001 | Ball | 228/44.7 |
| 6,383,890 B2 * | 5/2002 | Takisawa et al. | 438/455 |
| 6,475,881 B1 * | 11/2002 | Yamada | 438/464 |
| 6,663,077 B2 * | 12/2003 | Zou | 248/683 |
| 7,028,617 B2 * | 4/2006 | Shibabuki et al. | 101/477 |
| 7,857,926 B2 * | 12/2010 | Nobuchika et al. | 156/79 |
| 2002/0117792 A1 * | 8/2002 | Leidy et al. | 269/21 |
| 2005/0082698 A1 * | 4/2005 | Gutman et al. | 264/1.33 |

* cited by examiner

US 8,109,312 B2

TIRE PATCH APPLICATOR

BACKGROUND OF THE INVENTION

1. Field of the Invention

This invention relates generally to the application of a tire patch to a tire, and, more specifically, to applying tire patches to an inside surface of a tire.

2. Description of the Related Art

It is known that tires are susceptible to becoming damaged. Such damage may occur on the inside or outside of the tire, or may extend through the tire, such as a puncture. Damage may occur any where along a tire, such as along the belt or sidewall areas.

When repairing the damaged portion of a tire, a patch may be used to cover and seal the damaged portion. A patch may be made from various types of materials, such as, rubber and other polymeric materials. Often, the patch is applied to an inside surface of a tire. Prior to patch application, the inside tire surface may be cleaned. An adhesive may be utilized to create a bond between the tire surface and the patch. This adhesive may be applied to the tire and/or the tire patch prior to applying the patch to the tire. When applying a patch to a tire surface, it may be desirable to consistently apply each patch, and to provide a uniform thickness of adhesive for patch application.

SUMMARY OF THE INVENTION

Particular embodiments of the present invention include apparatus and methods for applying a patch to an interior surface of a tire. Particular embodiments of the apparatus include a patch holder having the top surface shaped to a contour of the interior surface of the tire, the patch holder comprising a patch receptacle [recessed from the top surface] and a plurality of orifices extending there through in fluid communication with a vacuum source, and, an adhesive barrier surrounding the patch receptacle.

Particular embodiments of a method of applying a tire patch to an interior surface of a tire may include the step of placing a patch into a patch receptacle in a tire patch holder, the patch holder having the top surface shaped to a contour of the interior tire surface and an adhesive barrier surrounding the patch receptacle. Other steps include placing an adhesive on an exposed surface of the tire patch within the adhesive barrier, and, pressing the patch into adhesive contact with the interior tire surface Particular embodiments of such methods may also include placing a patch into a patch receptacle in a tire patch holder, the patch holder having the top surface shaped to a contour of the interior tire surface; directing the patch holder to obliquely contact the interior surface of the tire; and, pressing the patch into substantial adhesive contact with the interior tire surface.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
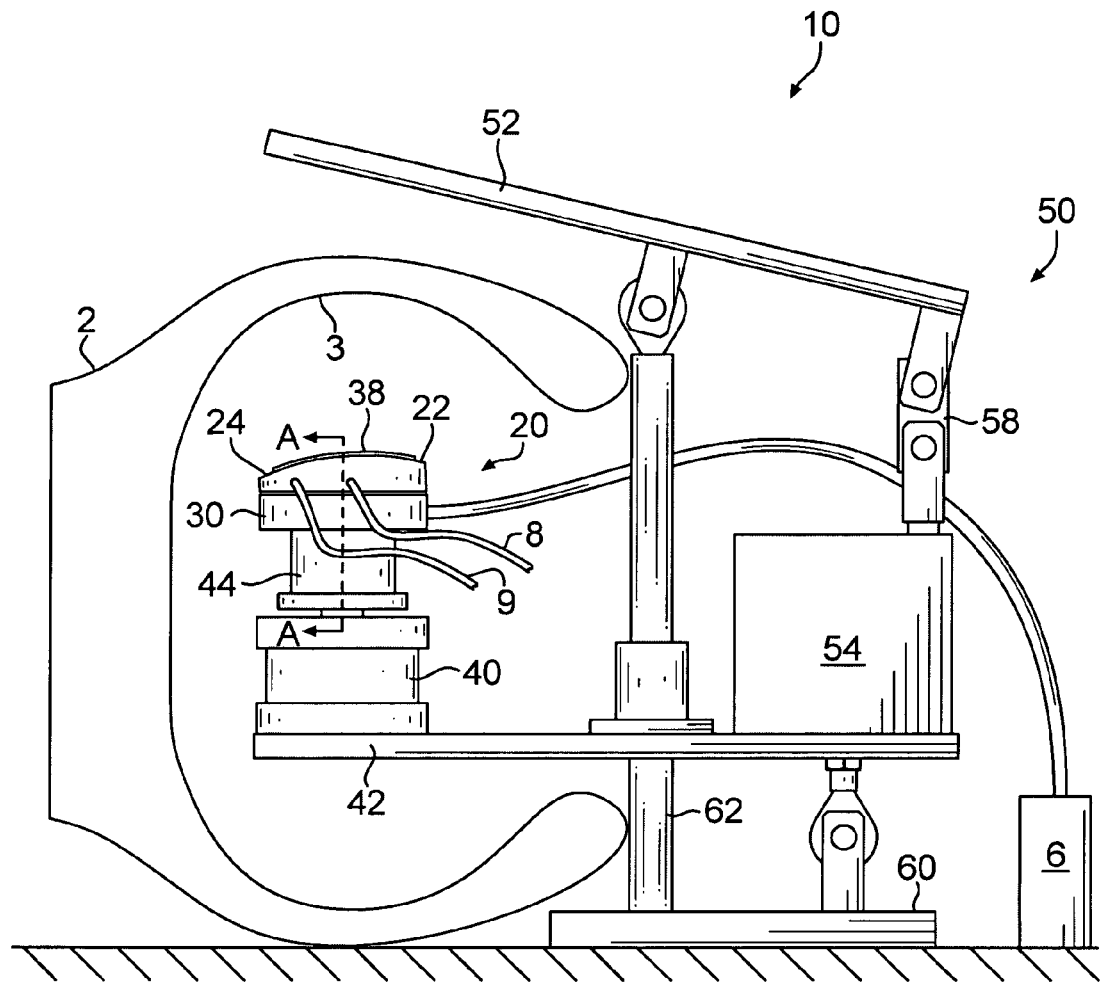
FIG. 1 is a side view of a tire patch applicator apparatus shown positioned within a tire in an initial position, in accordance with an embodiment of the invention.

Particular embodiments of the present invention include methods and apparatus for applying a patch to an inside surface of a tire. The patch to be applied may comprise any patch that may be attached to an interior tire surface, such as, for example, a repair patch or a radio frequency identification patch. Patches may be directly applied to the tire and subsequently cured thereto. In other embodiments, an adhesive may be used to facilitate attachment between a patch and a tire surface, which may be subsequently cured. Therefore, particular embodiments include a patch that may be cured before being applied to the interior surface of the tire, a patch that needs no curing at all or a patch that may be cured after being applied to the interior surface of the tire.

Particular embodiments of such methods may include the step of placing a patch into a patch receptacle in a tire patch holder, the patch holder having the top surface shaped to a contour of the interior tire surface and an adhesive barrier surrounding the patch receptacle. Because a tire is generally contains various rounded surfaces, a patch holder may generally be shaped so to adapt to the tire surface contour to which it will apply a patch. This may generally prevent any interference between the holder and the tire surface, thereby providing patch access to the tire surface. When utilizing an adhesive to attach a patch to a tire surface, a barrier may be used to maintain a thickness of adhesive along a top or exposed surface of the patch. The barrier typically surrounds at least a portion of the edges of the patch. Otherwise, the adhesive may flow beyond the edges of the patch instead of providing the desired thickness of adhesive between the patch and the interior surface.

Particular embodiments of such methods may also include the step of placing an adhesive on an exposed surface of the tire patch within the adhesive barrier. Particular embodiments of the step of placing may include placing an adhesive to substantially a top of the barrier. Particular embodiments may include an adhesive having a thickness of about 2.5 millimeters or less, and of about 0.6 millimeters or less but in all cases, at least 0.01 millimeters. The thickness of the adhesive may be changed or altered by providing different sized barriers. In particular embodiments, the barrier may extend above the surface of the patch holder or, if at least a portion of the patch receptacle is recessed below the surface of the patch holder, the barrier may be formed at least in part by the wall formed by the patch holder around the recessed portion.

Particular embodiments of such methods may also include the step of suctioning the patch within the patch receptacle by way of negative pressure contained within a plurality of orifices extending through the patch receptacle in fluid communication with a vacuum source. Providing vacuum pressure to a patch positioned within the patch holder or receptacle, the patch is better secured and more uniformly positioned and retained therein, which may also provide a more uniform thickness of adhesive when placed on the exposed surface of the patch.

Particular embodiments of such methods may include also the step of pressing the patch into adhesive contact with the interior tire surface. Pressing may be achieved by an actuator and/or by providing positive air pressure against the patch by virtue of the patch holder. Particular embodiments may also include the step of directing the patch holder to obliquely contact the interior surface of the tire. It may be desirable to obliquely contact the patch with the tire surface, such as, for example, to prevent or deter air from becoming trapped between the patch and the tire surface. Therefore, the patch may be gradually applied to the interior tire surface by initially contacting a side-portion of the patch to the interior tire surface and subsequently placing adjacent portions of the patch into contact with the tire surface. The intent it to prevent any bridging of air between the patch and the tire surface. This operates to roll air from between the patch and the tire.

The methods described herein are used to apply a patch to an interior tire surface. Exemplary embodiments of a patch applicator for use in performing such methods are discussed in further detail below.

Particular embodiments of an apparatus for applying a patch to an inside surface 3 of a tire may include a patch applicator 10. Particular embodiments include applying a patch to a sidewall portion of a tire 2, which is exemplarily shown in FIG. 1.

Patch applicator 10 may generally include a patch holder 20 for holding a tire patch 4 during application thereof to an interior tire surface 3. With specific reference to FIGS. 1-6, particular embodiments of patch holder 20 may include a top plate 22 having the top surface 24 shaped to an interior tire surface contour to which the patch is generally to be applied. Accordingly, the top surface 24 may comprise any linear or non-linear contour. Top plate 22 may also include a patch receptacle 26 for receiving and holding a patch 4. In such an embodiment, top surface 24 may extend about a perimeter of receptacle 26, and/or any barrier 38, which is disclosed below. Receptacle 26 may be shaped to a surface contour of patch 4, which may form any linear or non-linear contour.

Figure 4:
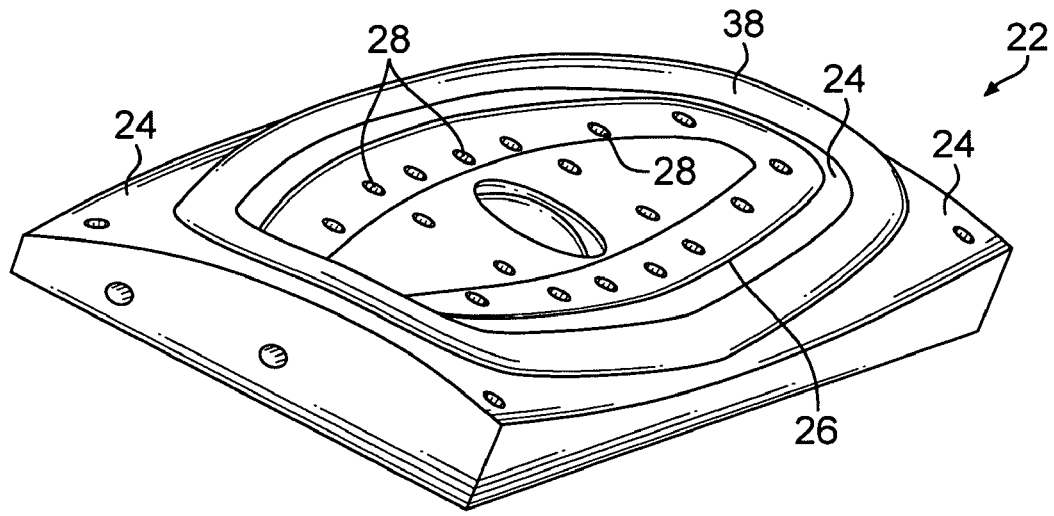
FIG. 4 is a perspective view of the patch holder top plate shown in FIG. 1, in accordance with an embodiment of the invention.
Figure 6:
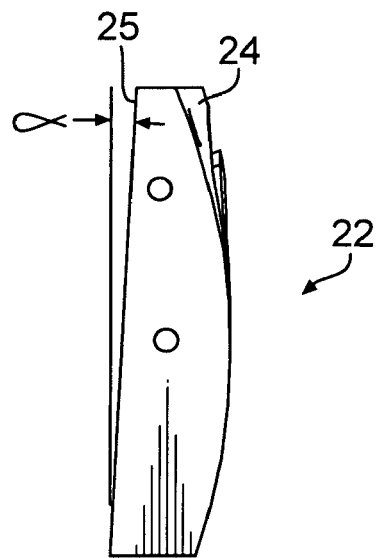
FIG. 6 is a side view of the patch holder top plate of the tire stitching machine shown in FIG. 1, in accordance with an embodiment of the invention.
Figure 5:
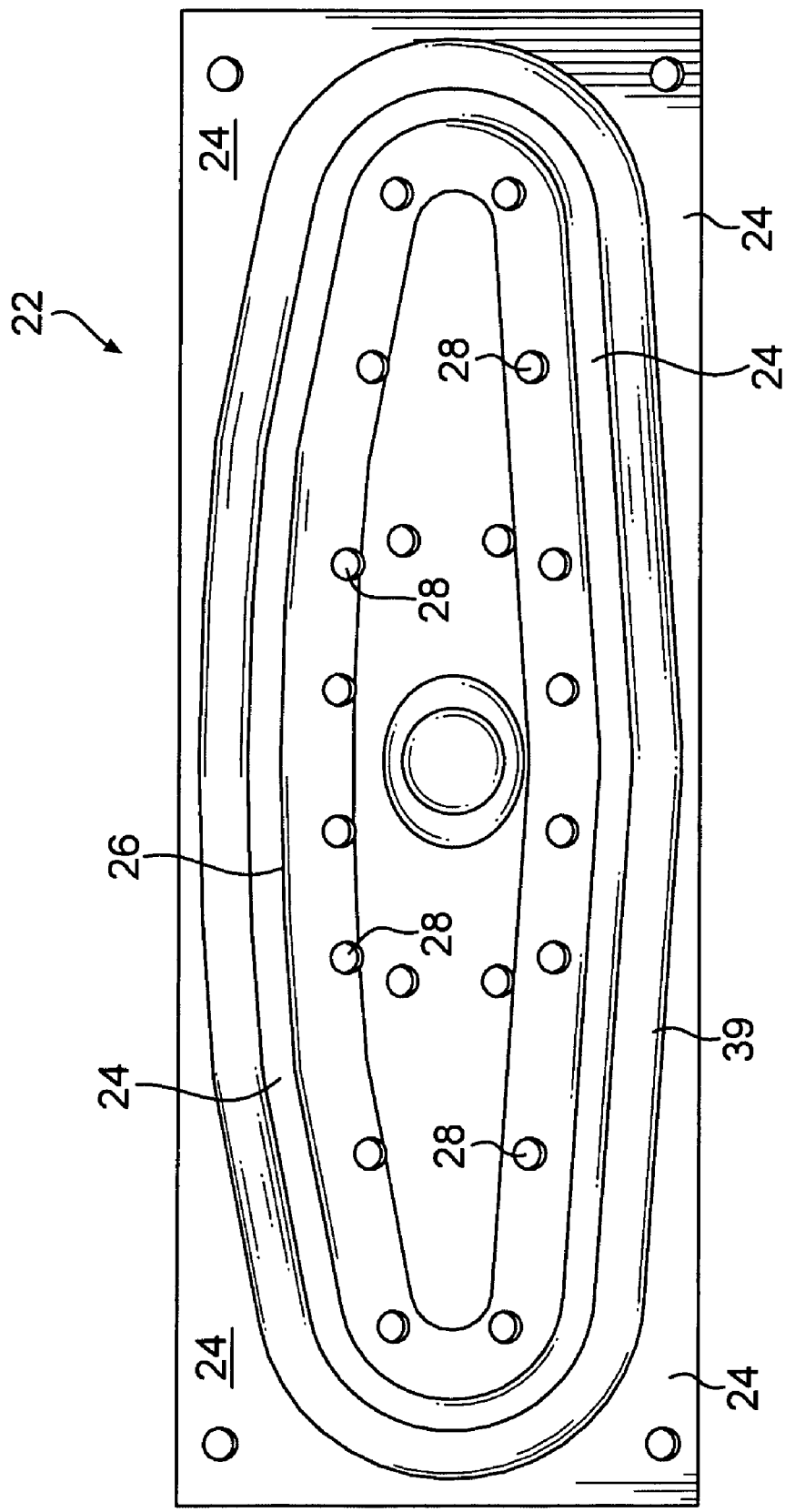
FIG. 5 is a top view of the patch holder top plate shown in FIG. 1, in accordance with an embodiment of the invention.
Figure 7:
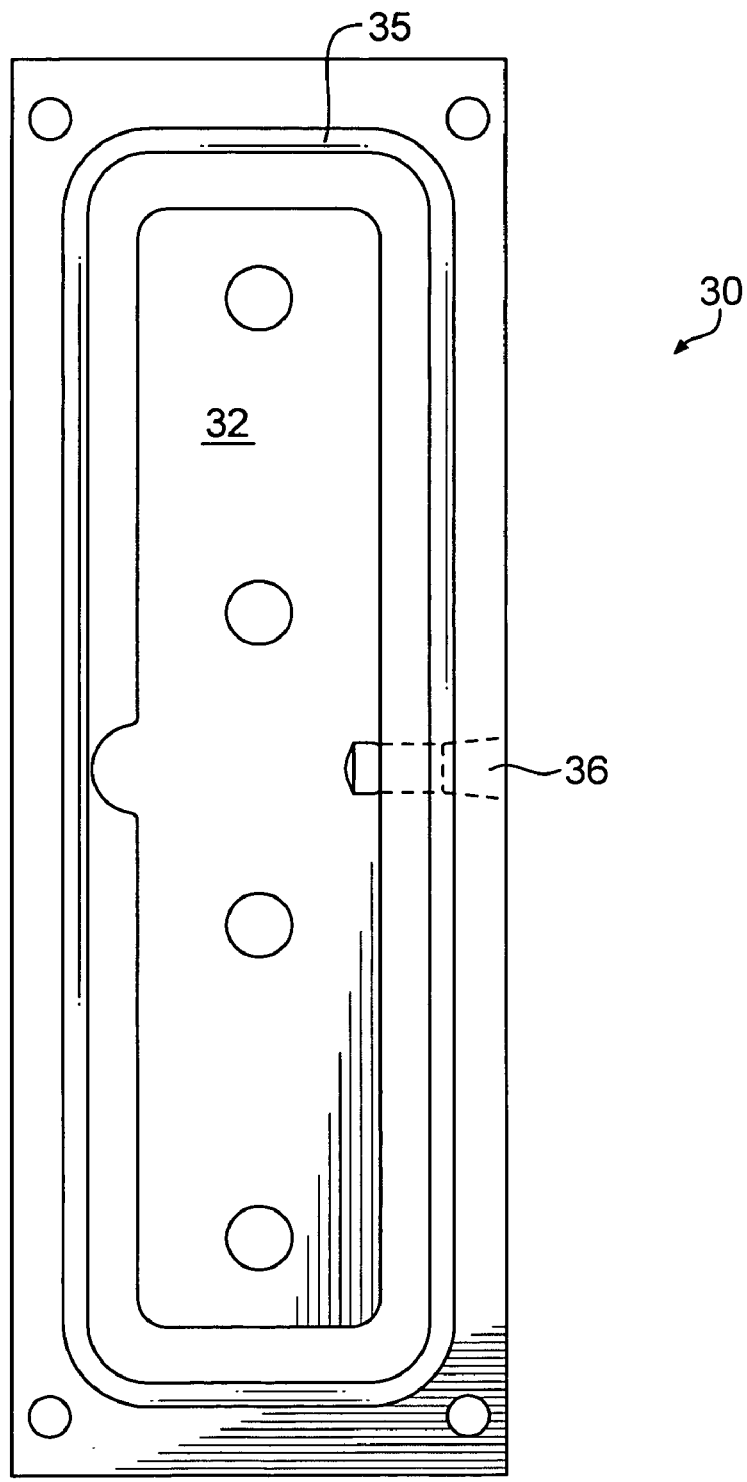
FIG. 7 is a top view of the patch holder bottom plate of the tire stitching machine shown in FIG. 1, in accordance with an embodiment of the invention.

With specific reference to FIGS. 4-5, particular embodiments of receptacle 26 may include one or more orifices 28 in fluid communication with a pressure source 6. Pressure source 6 may comprise a vacuum (i.e., negative pressure) source to create negative pressure along a surface of patch 4 for the purpose of retaining and securing patch 4 within receptacle 26. Pressure source 6 may also comprise a positive pressure source so to provide ejecting and application pressure for attaching patch 4 to the interior tire surface 3. It is contemplated that orifices 28 may be particularly distributed across receptacle 26 so to provide more uniform pressure across patch 4. With reference to FIGS. 1-3a, and 7, a bottom plate 30 may be used in conjunction with top plate 22 to provide a pressure chamber 32 that supplies pressure to each of the orifices 28. A sealing member 34 may be located between top and bottom plates 22, 30, and extend around chamber 32 to seal pressure chamber 32. Sealing member 34 may be partially located within a sealing member groove 35, which may be located in the top or bottom plate 22, 30, respectively. Sealing member 34 may comprise any known means of sealing, such as, for example an o-ring or gasket, or silicone. Fluid communication between bottom plate 30 and pressure source 6 may be provided through aperture 36.

In particular embodiments, an adhesive 5 may be applied to patch 4 prior to its application to the interior tire surface 3. Adhesive 5 may comprise any adhesive known to one of ordinary skill in the art for attaching a tire patch to a tire. Because it may be desired to constrain the adhesive 5 atop patch 4 (i.e., to prevent an overflow or side-flow of adhesive from patch 4), a barrier 38 may be provided that surrounds receptacle 24 and extends outwardly from holder 20 to a height (H) above patch 4 or above a top of receptacle 26, as exemplarily shown in FIGS. 3-4. Barrier 38 may also be used to provide a desired thickness of adhesive atop patch 4, as barrier 38 may provide a height (H) that corresponds to a desired thickness of adhesive 5 (i.e., when the adhesive 5 is applied to the top of barrier 38) as exemplarily shown in FIGS. 3 and 3a. Height (H) may comprise any desired height. In particular embodiments, height (H) is 2.5 millimeters (mm) or less. In other embodiments, height (H) is 0.6 mm or less.

In particular embodiments, barrier 38 may exist independent of holder 20 and extend from a surface of holder 20. In particular embodiments thereof, barrier 38 extends outwardly from a barrier groove 39, as exemplarily represented by FIG. 3; however, it is contemplated that any other known means of attaching or associating barrier 38 to holder 20 may be used, such as welding, adhesives, or mechanical fasteners. It is contemplated that barrier 38 may comprise any material that does not substantially adhere or bond to the desired adhesive 5, such as, without limitation, a metal such as steel or aluminum, or a plastic or polymeric material. Barrier 38 may comprise any form, such as a machined member, or an o-ring, gasket, or the like. In one embodiment, barrier 38 comprises an o-ring formed of EDPM (Ethylene-Propylene-Diene Monomer). It is contemplated that barrier 38 may be removable, so that barriers 38 may be easily replaced and/or to provide different sized barriers 38 that may be used to adjust the thickness of any adhesive applied to a patch 4 within receptacle 26. For example, o-rings having a diameter of ¼ inch through 3⁄32 inch and smaller may be used. In other embodiments, as exemplarily shown in FIG. 3a, barrier 38 may form an outwardly extending portion of top plate 22, so to provide a more recessed receptacle 26. In such embodiments, the barrier 38 is monolithic with holder 20 and/or top plate 22.

Figure 2:
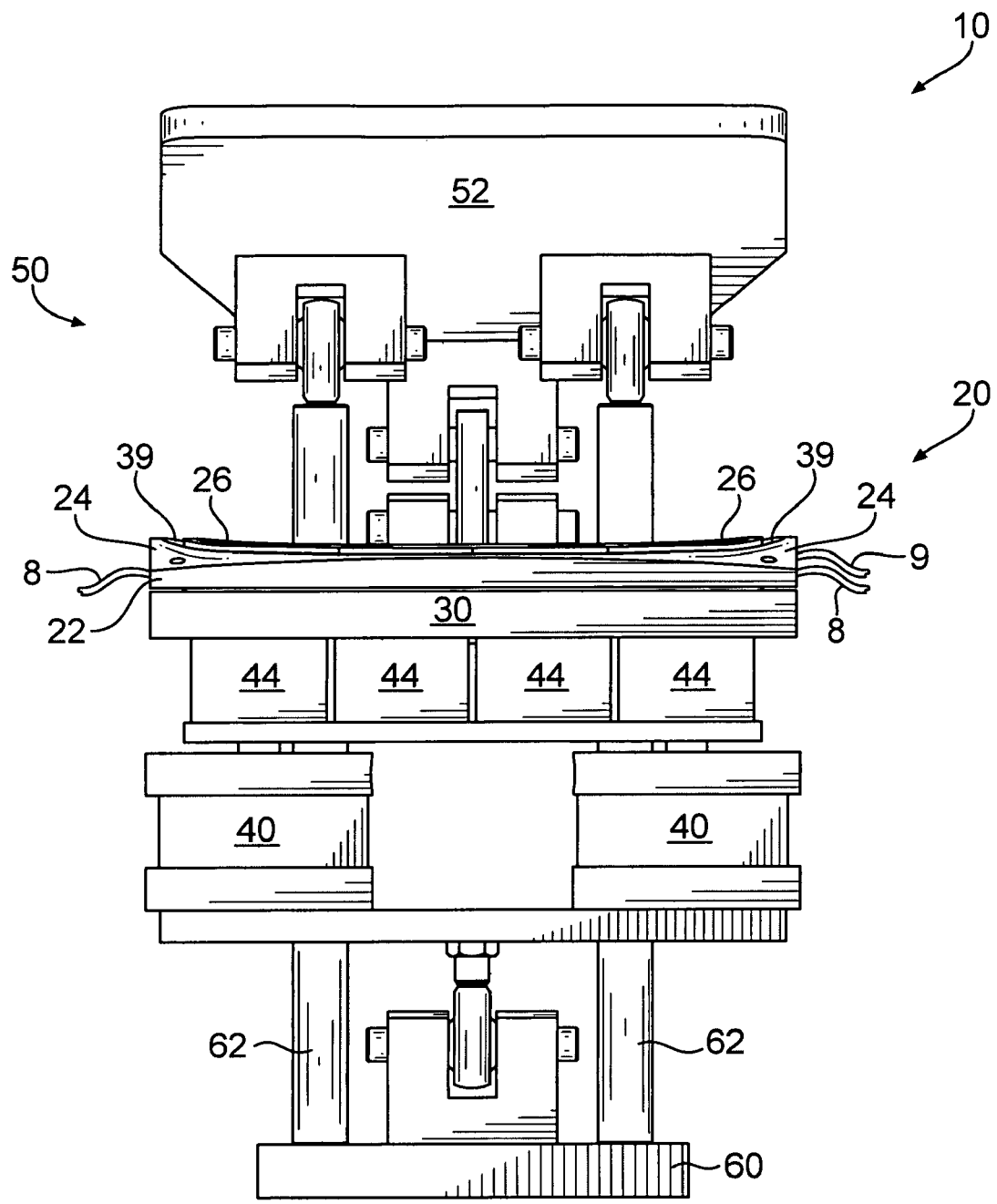
FIG. 2 is a front view of the tire patch applicator apparatus shown in FIG. 1 without a barrier located along the top plate.
Figure 3:
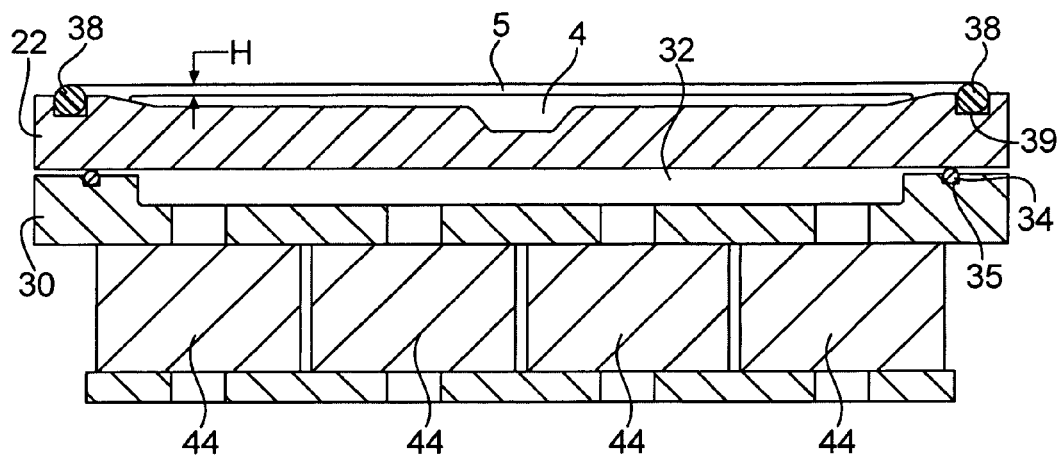
FIG. 3 is a cross-sectional view of the patch holder assembly as shown in FIG. 1 along section A-A, and which is shown with an exemplary patch and adhesive, in accordance with an embodiment of the invention.
Figure 3A:
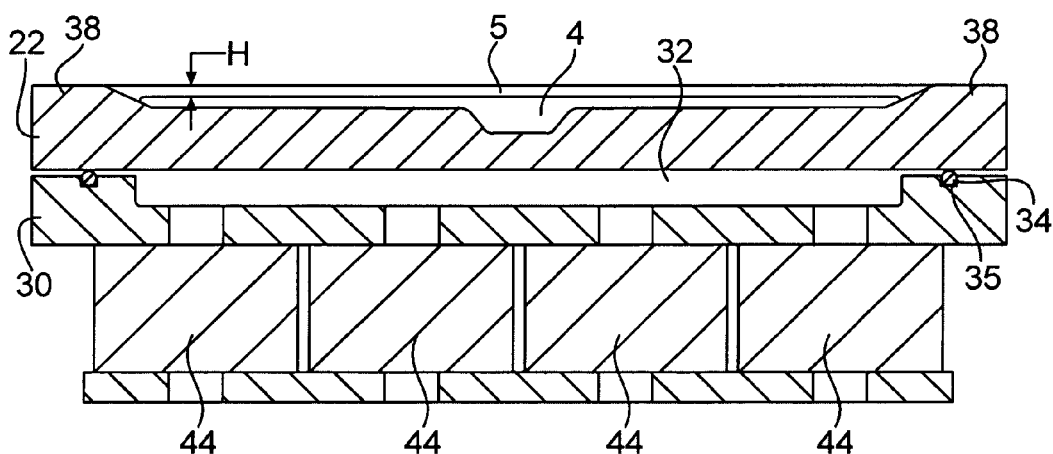
FIG. 3a is a cross-sectional view of an alternative embodiment of the patch holder assembly shown in FIG. 3, and which is shown with an exemplary patch and adhesive.

Particular embodiments of the invention, such as shown in FIGS. 1-2, patch holder 20 may also include one or more heaters 8 that extend within cavities in top plate 22. Heaters 8 may be used to cure any adhesive used to secure patch 4 to tire surface 3. Further, one or more thermocouples may also extend within top plate 22 for the purpose of monitoring the temperature of top plate 22. The signals generated by a thermocouple 9 may be used by a controller (not shown) to alter the output of a heater 8 to achieve a desired temperature for top plate 22.

Applicator 10 may also include one or more patch holder actuator 40 for directing holder 20 into contact with tire 2 and for pressing holder 20 and/or patch 4 into contact with interior tire surface 3. In particular embodiments, as exemplarily shown in FIGS. 1-2, a patch holder actuator 40 may comprise an actuator, such as, for example, a pneumatic or hydraulic cylinder. Patch holder actuator 40 may extend from a holder base 42 and operably attach to holder 20.

Particular embodiments of applicator 10 may include a flexible holder support 44 that generally extends between holder 20 and patch holder actuator 40. Flexible support 44 may be used to provide a gradual or side-to-side application of patch 4 upon tire surface 3, which may assist in reducing or eliminating the trapping of air between patch 4 and the tire surface 3. To achieve the gradual or side-to-side application of patch 4, the contoured top surface 24 may be initially applied in an oblique relation to interior tire surface 3, as exemplarily shown in FIGS. 9 and 10. In other words, the top surface 24 is shaped to a contour of a tire surface 3, but is arranged such that the top surface 24 is not evenly spaced in relation to the associated tire surface 3. A non-uniform gap (G) is shown in FIG. 10, which exemplifies the oblique relationship between the top surface 24 and the tire surface 3. It is contemplated that this oblique relationship may be achieved in numerous ways. For example, this oblique arrangement may be achieved by angling any of the non-vertical surfaces of holder 20, flexible holder support 44, patch holder actuator 40, or holder base 42. In an embodiment, back side 25 of top plate is angled relative to the top surface 24 by an angle ($\alpha$) to provide an oblique relationship between top surface 24 and tire surface 3. It is contemplated that the oblique relationship, or angled relationship, which may be exemplified by angle ($\alpha$) may comprise any angle, such as, for example 3 degrees.

Patch applicator 10 may also include a counter-pressure assembly 50, which contacts and supports an associated portion of tire 2 during the application of patch 4 to the interior tire surface 3. Particular embodiments of assembly 50, as shown in FIGS. 1-2, include a resistive member 52 that is placed into contact with an exterior portion of tire 2 substantially opposite patch holder 20. Resistive member 52 may generally comprise any structure formed from any rigid material, such as, for example, steel or aluminum. In particular embodiments, member 52 may comprise a plate; however, it is contemplated that resistive member 52 may comprise any form or shape, such as, for example, member 52 may be a rod or an arced structure.

In particular embodiments, resistive member 52 may be placed into resistive contact with tire 2 by way of an actuator 54. In the embodiment shown in FIGS. 1-2, actuator 54 is operably attached to resistive member 52 and extends between member 52 and an applicator base 60 so to rotate member 52 about a pivot 56, and thereby direct a portion of member 52 into contact with an exterior portion of tire 2 opposite holder 20. Actuator 54 may also forcibly maintain the tire-contacting position of resistive member 52, so to resist or counter the pressure exerted upon patch 4 during the application thereof to the interior tire surface 3. Actuator 54 may comprise a linear actuator, a pneumatic or hydraulic cylinder, or any other device capable of achieving the desired results that is known to one of ordinary skill in the art. A linkage 58 may extend between resistive member 52 and actuator 54 to achieve a desired rotation of member 52. In particular embodiments, such as shown in FIGS. 1-2, actuator 54 may attach to the holder base 42 and extend from an applicator base 60, which may in turn translate holder base 42 vertically about one or more shafts 62. Accordingly, holder 20 translates vertically while actuator 54 is rotating resistive member 52 into contact with tire 2.

Figure 8:
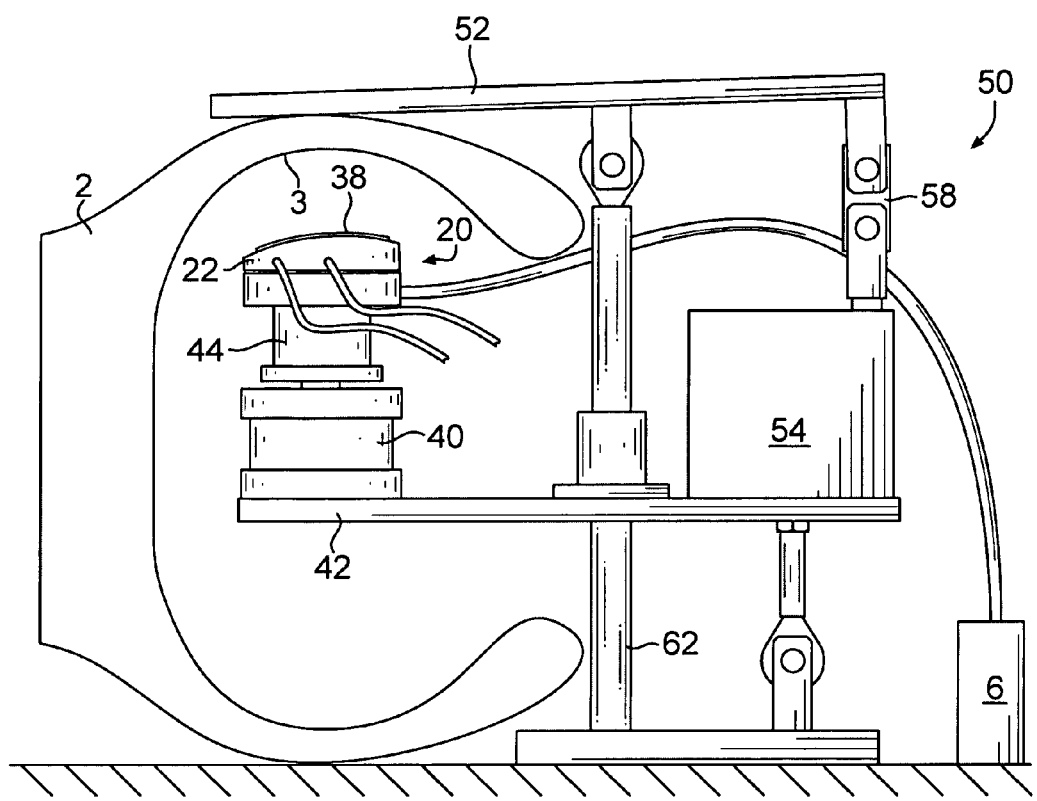
FIG. 8 is a side view of a tire patch applicator apparatus shown positioned within a tire where the counter-pressure resistive member is contacting the outside of the tire, in accordance with an embodiment of the invention.
Figure 9:
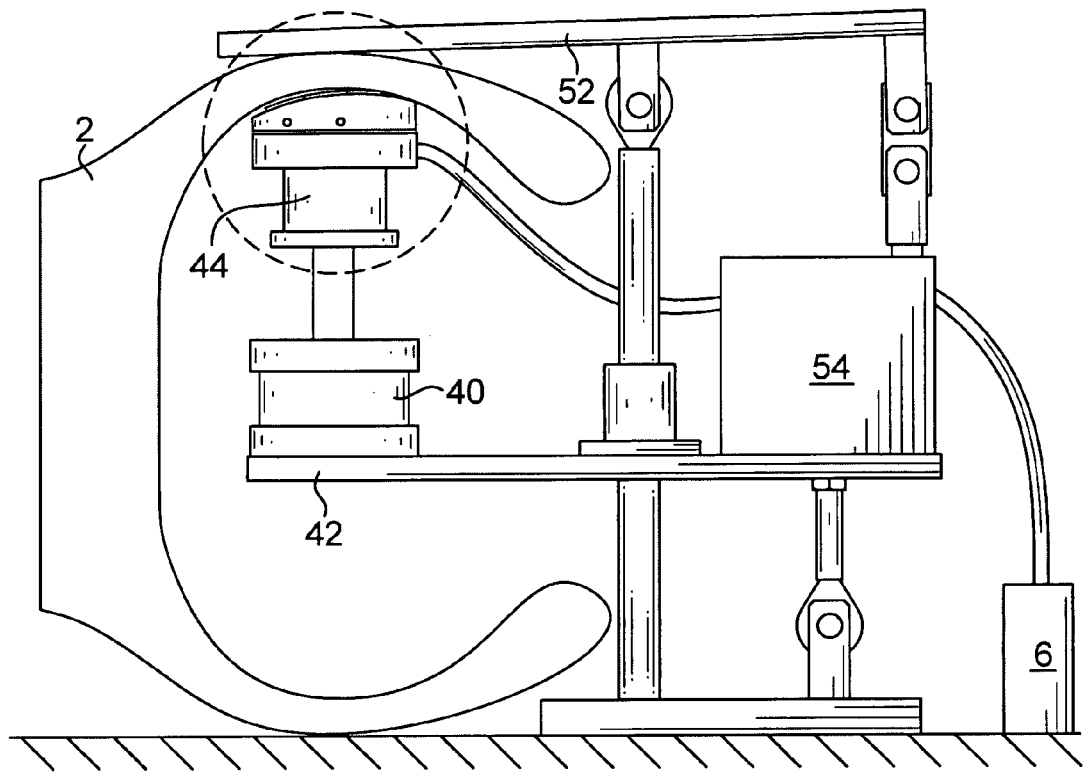
FIG. 9 is a side view of a tire patch applicator apparatus shown positioned within a tire in which the patch holder initially contacts the inside surface of the tire in an oblique relation prior to full engagement, in accordance with an embodiment of the invention.
Figure 10:
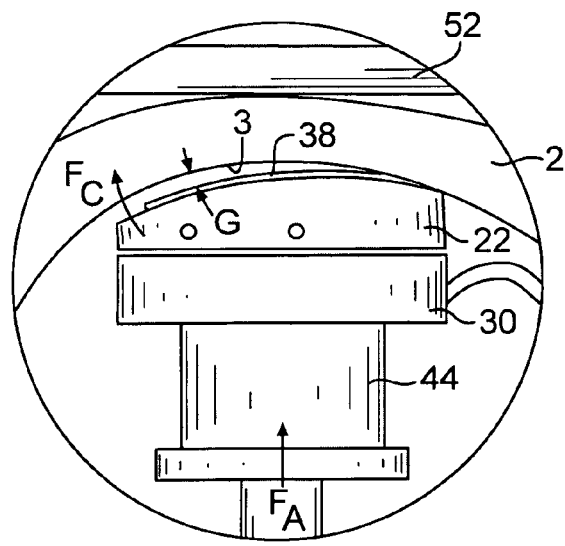
FIG. 10 is an enlarged view of the circled portion of FIG. 9, showing in more detail the initial oblique engagement of the patch holder with the interior tire surface, in accordance with an embodiment of the invention.

With reference to FIGS. 1, 9, 10, applicator 10 is shown in operation exemplarily performing the methods discussed herein, in accordance with the present invention. With specific reference to FIG. 1, applicator 10 is arranged in relation to tire 2, such that holder 20 is placed within the interior of tire 2 as desired to patch the interior tire surface 3. With reference to FIG. 8, actuator 54 extends, so to cause resistive member 52 to rotate about pivot 56 until contacting the outer surface of the tire 2. Concurrently, holder base 42 is lifted vertically with holder 20 toward the interior tire surface 3. Once resistive member 52 engages tire 2, actuator 54 may maintain the position of resistive member 52, so to provide resistive forces (i.e., counter-pressure) to the vertical forces generated during patch application.

FIG. 9 exemplarily shows the holder actuator extending patch holder 20 towards an interior tire surface 3. Holder 20 may extend so that holder 20 (i.e., top surface 24, barrier 38, patch 4, and/or adhesive 5) uniformly contacts tire surface 3 upon initial engagement. In the alternative, as exemplarily shown in FIG. 9, patch holder 20 (i.e., top surface 24, barrier 38, patch 4, and/or adhesive 5) may initially contact interior tire surface 3 obliquely, which is shown in greater detail in FIG. 10. After initially contacting the tire surface 3 in an oblique arrangement, additional force ($F_A$) is provided by holder actuator 40 to force patch 4 into substantially full engagement with tire surface 3. In operation, flexible holder support 44 deforms to cause the gradual closure of gap (G) as represented by closing force (Fc), which pushes air outward from between patch 4 and tire surface 3.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. An apparatus for applying a patch to an interior surface of a tire, the apparatus comprising:
 a tire, a patch, and a patch holder comprising an applicator plate having a length, a width, and a thickness and a non-flat top surface generally extending along the length and width of the applicator plate and shaped to facilitate application of the patch to a curved interior surface of the tire, the patch holder further including: a patch receptacle at least partially recessed from the top surface and shaped to receive the tire patch for application to the curved interior tire surface; and a plurality of orifices positioned within the receptacle and extending into the thickness of the holder structure and being in fluid communication with a vacuum source;
 an adhesive barrier surrounding the patch receptacle and defining an adhesive-receiving area above the patch receptacle, the barrier extending outwardly from the top surface of the applicator plate by a desired height to retain a desired thickness of adhesive within the adhesive-receiving area of the patch holder; and,
 means for forcibly placing the patch holder into contact with the interior tire surface, said means arranged to translate the patch holder into engagement with the interior tire surface, the patch holder extending from a pre-tire-engagement position until engaging the tire in a tire-engagement position; and a counter-pressure assembly including the resistive member toward the patch holder.

2. The apparatus of claim 1, wherein the barrier is elastic.

3. The apparatus of claim 1, wherein the patch receptacle recess has a variable depth and a contoured bottom surface configured to receive a similarly contoured side of the patch.

4. The apparatus of claim 1 further comprising:
a flexible patch holder support for transmitting a patch application force to the receptacle from one or more holder actuators comprising the means for forcibly placing the patch holder into contact with the interior tire surface, the support forming a deformable and pivotable joint interposed between the patch holder and the one or more holder actuators, whereby the patch holder is pivotable in a sideways direction relative to a translation direction of the patch holder to allow the patch holder to pivot after initially and partially engaging the tire surface to gradually apply the patch to the curved interior tire surface of the tire as the one or more holder actuators continue to extend and apply the patch application force to deform the flexible patch holder support during patch installation.

5. The apparatus of claim 4, the patch holder top surface being positioned a variable distance from a curved interior tire surface in the pre-tire-engagement position to obliquely engage the curved interior tire surface as patch holder initially engages the curved tire surface when the one or more holder actuators direct the patch holder to the tire-engagement position.

6. The apparatus of claim 1, wherein both the counter-pressure actuator and one or more patch holder actuators, which together comprise the means for forcibly placing the patch holder into contact with the interior tire surface, are arranged to translate the patch holder towards the tire-receiving area for patch application and are operably attached to a base, the base being translatably connected to one or more shafts interposed between the one or more patch holder actuators and the counter-pressure actuator, the one or more shafts extending longitudinally in a translation direction of the base, where the one or more patch holder actuators are arranged to translate patch holder relative to the base and the counter-pressure actuator is arranged to move the base with the one or more patch holder actuators and the patch holder relative to the one or more shafts.

7. The apparatus of claim 1, wherein the top surface is curved to generally match a contour of the curved interior surface of the tire.

8. The apparatus of claim 1, wherein the patch holder comprises a top plate arranged atop a bottom plate and a sealing member arranged between the top and bottom plates in a sealing engagement, the sealing member extending around a central a pressure chamber for supplying pressure to the plurality of orifices arranged within the patch receptacle, the patch receptacle being arranged within the top plate opposite the chamber and the plurality of orifice extending from the chamber and through a thickness of the top plate.

9. The apparatus of claim 8, wherein the patch holder top plate includes one or more heaters to provide heat for assisting in the curing of an adhesive positioned along the patch for securing the patch to the tire.

10. The apparatus of claim 1, wherein adhesive is arranged atop the tire patch positioned within the patch receptacle, wherein a distance remains between the patch retained within the receptacle and the top of the adhesive barrier to define an area for receiving the adhesive, the apparatus being arranged within the annular tire such that the patch holder is arranged to extend by way of the means for forcibly placing the patch holder into contact with the interior tire surface to engage the interior tire surface whereby the adhesive and patch are generally shaped similarly to the interior tire surface.

11. The apparatus of claim 6, wherein the one or more patch holder actuators are positioned along a cantilevered portion of the base, the cantilevered portion extending from a first portion of the base that is operably engaged with the one or more shafts and the counter-pressure actuator.

* * * * *